United States Patent
Roth

(10) Patent No.: US 10,457,375 B2
(45) Date of Patent: Oct. 29, 2019

(54) AIRCRAFT INTERIOR FITTING COMPONENT SYSTEM AND METHOD FOR MANUFACTURING AN AIRCRAFT INTERIOR FITTING COMPONENT SYSTEM

(71) Applicant: Airbus Operations GmbH, Hamburg (DE)

(72) Inventor: Ingo Roth, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 416 days.

(21) Appl. No.: 15/360,309

(22) Filed: Nov. 23, 2016

(65) Prior Publication Data

US 2017/0144742 A1    May 25, 2017

(30) Foreign Application Priority Data

Nov. 25, 2015  (DE) .................. 10 2015 223 267

(51) Int. Cl.
| | | |
|---|---|---|
| *B64D 11/00* | (2006.01) | |
| *B64C 1/06* | (2006.01) | |
| *B64F 5/10* | (2017.01) | |

(52) U.S. Cl.
CPC .............. *B64C 1/066* (2013.01); *B64C 1/061* (2013.01); *B64D 11/003* (2013.01); *B64F 5/10* (2017.01); *Y02T 50/46* (2013.01)

(58) Field of Classification Search
CPC .............. B64D 11/0023; B64D 11/003; B64D 2011/0046; B64D 11/02; B64D 11/04
See application file for complete search history.

(56) References Cited

U.S. PATENT DOCUMENTS

| | | | |
|---|---|---|---|
| 5,108,048 A | * | 4/1992 | Chang .................. B64D 11/003 244/118.1 |
| 5,842,668 A | * | 12/1998 | Spencer ............... B64D 11/003 244/118.1 |
| 5,938,149 A | | 8/1999 | Terwestern |

(Continued)

FOREIGN PATENT DOCUMENTS

| | | |
|---|---|---|
| DE | 202005014077 | 12/2005 |
| DE | 102010008622 | 8/2011 |

(Continued)

OTHER PUBLICATIONS

German Search Report, dated Nov. 11, 2016 for Appl. No. 102015223267.0.

(Continued)

*Primary Examiner* — Brian M O'Hara
(74) *Attorney, Agent, or Firm* — Greer, Burns & Crain, Ltd.

(57) ABSTRACT

An aircraft interior fitting component system comprising an aircraft interior fitting component, a support element attached to the aircraft interior fitting component, and an aircraft primary structure component. The support element is dimensioned in such a way and is attached to the aircraft interior fitting component in such a position that, in an assembled state of the aircraft interior fitting component in an aircraft, it is supported on the aircraft primary structure component at least when a predetermined load acts on the aircraft interior fitting component along the x-axis of the aircraft in flight direction.

14 Claims, 3 Drawing Sheets

(56) References Cited

U.S. PATENT DOCUMENTS

| | | | |
|---|---|---|---|
| 7,527,221 B2 | 5/2009 | Humfeldt et al. | |
| 8,047,468 B2 * | 11/2011 | Schmitz | B64D 11/003 244/118.1 |
| 2007/0262212 A1 | 11/2007 | White | |
| 2013/0026293 A1 | 1/2013 | Schneider | |
| 2014/0152159 A1 | 6/2014 | Schneider | |
| 2015/0090838 A1 | 4/2015 | Schmitz et al. | |

FOREIGN PATENT DOCUMENTS

| | | |
|---|---|---|
| DE | 102011108895 | 1/2013 |
| EP | 2905225 A1 | 8/2015 |

OTHER PUBLICATIONS

European Search Report from corresponding European patent application No. 16200462.6, dated May 7, 2017.

* cited by examiner

AIRCRAFT INTERIOR FITTING COMPONENT SYSTEM AND METHOD FOR MANUFACTURING AN AIRCRAFT INTERIOR FITTING COMPONENT SYSTEM

CROSS REFERENCE TO RELATED APPLICATIONS

This application claims priority to German Patent Application No. 10 2015 223 267.0 filed on Nov. 25, 2015, the entirety of which is incorporated herein by reference.

FIELD OF THE INVENTION

The invention relates to an aircraft interior fitting component system and a method for manufacturing an aircraft interior fitting component system.

A plurality of interior fitting components, such as baggage compailinents, lining components and monuments, in particular washrooms, galley modules or partition walls, are installed in the cabin of a modern passenger aircraft. The interior fitting components are currently usually fixed to the aircraft structure in such a way that the fixing of the interior fitting components along an x-axis of the aircraft in flight direction, i.e. along a longitudinal axis of the aircraft in flight direction, withstands a load of 9 g. To fix the interior fitting components to the aircraft structure, tie rods are normally used, which introduce the loads acting on the interior fitting components at their two ends as point loads into the interior fitting components or the aircraft structure.

An object of the invention is to specify an aircraft interior fitting component system that has a reduced weight compared with conventional aircraft interior fitting component systems. Another object of the invention is to specify a method for manufacturing such an aircraft interior fitting component system.

SUMMARY OF THE INVENTION

This object may be achieved by an aircraft interior fitting component system with the features of one or more embodiments described herein and a method for manufacturing an aircraft interior fitting component system with the features of one or more embodiments described herein.

An aircraft interior fitting component system comprises an aircraft interior fitting component and a support element attached to the aircraft interior fitting component. The aircraft interior fitting component system further comprises an aircraft primary structure component, i.e. a structure component that is suitable for taking up loads. The support element is dimensioned in such a way and attached to the aircraft interior fitting component in such a position that, in an assembled state of the aircraft interior fitting component in an aircraft, it is supported on the aircraft primary structure component at least when a predetermined load acts on the aircraft interior fitting component along an x-axis of the aircraft in the flight direction of the aircraft. The term "x-axis" here describes a longitudinal axis of the aircraft.

Unlike conventional aircraft interior fitting assemblies, the aircraft interior fitting component system is thus designed in such a way that the aircraft interior fitting component is supported on an element of the primary structure of the aircraft at least if required, i.e. in a load case when the predetermined load acts on the aircraft interior fitting component along the x-axis of the aircraft in flight direction. When viewed along the x-axis of the aircraft, the support element thus is arranged behind the aircraft primary structure component. The demands made on the aircraft interior fitting component in respect of its bearing properties can therefore be much smaller than in the case of aircraft interior fitting components installed in conventional aircraft interior fitting assemblies. For example, stiffening the surfaces of the aircraft interior fitting component that extend perpendicular to the x-axis of the aircraft in the assembled state of the aircraft interior fitting component in an aircraft can be dispensed with. The weight of the aircraft interior fitting component and consequently the weight of the overall aircraft interior fitting component system can be reduced by this.

The support element preferably is dimensioned in such a way and attached to the aircraft interior fitting component in such a position that, in an assembled state of the aircraft interior fitting component in an aircraft, it is arranged at a distance from the aircraft primary structure component when no load, or only a load falling below the predetermined load, acts on the aircraft interior fitting component along the x-axis of the aircraft in flight direction. Such a dimensioning and positioning of the support element ensures that in normal flight mode of an aircraft equipped with the aircraft interior fitting component system, no permanent contact exists between the support element and the aircraft primary structure component. The continuous loading and consequently the wear of these two components can be reduced by this.

In a load case, i.e. when the predetermined load acts on the aircraft interior fitting component along the x-axis of the aircraft in flight direction, a displacement of the aircraft interior fitting component then preferably occurs along the x-axis of the aircraft in flight direction, due to which the support element comes into abutment on the aircraft primary structure component and thereby ensures support of the aircraft interior fitting component. Such a displacement of the aircraft interior fitting component along the x-axis of the aircraft in flight direction can be attained, for example, by bearing of the aircraft interior fitting component via suitably elastically deformable elements, such as shock absorbers, for example.

In a preferred embodiment of the aircraft interior fitting component system, the aircraft interior fitting component is preferably formed in the form of a baggage compathnent. However, it is also conceivable to provide an aircraft interior fitting component in the aircraft interior fitting component system that is in the form of a lining component or a monument. An aircraft interior fitting component in the form of a monument can be a partition wall, a galley module or a washroom, for example.

The support element may comprise a plate-shaped section with a support surface. The support surface is preferably provided to come into abutment on the aircraft primary structure component when the predetermined load acts on the aircraft interior fitting component along the x-axis of the aircraft in flight direction. A support element with a plate-shaped section, on which the support surface is formed for interaction with the aircraft primary structure component, is easy to manufacture and to fit and moreover it has a low weight. The plate-shaped section can also be dimensioned comparatively easily in such a way that it is suitable to take up a desired load acting along the x-axis of the aircraft in flight direction.

The support element may further comprise at least one support load take-up section, which is configured to take up a support load that acts on the support element along the x-axis of the aircraft in a direction opposed to the flight direction of the aircraft when the support element is supported on the aircraft primary structure component, i.e. when the support surface of the support element comes into abutment on the aircraft primary structure component. The at least one support load take-up section may create a connection, for example, between the aircraft interior fitting component and a surface of the support element opposed to the support surface of the support element. Depending on the weight of the aircraft interior fitting component to be supported in a load case, the support element preferably comprises several support load take-up sections, which may be arranged parallel to one another, for example.

The at least one support load take-up section may have a triangular shape, for example. A first leg of the support load take-up section may be connected to the aircraft interior fitting component. A second leg of the support load take-up section may be connected, on the other hand, to the plate-shaped section of the support element. In particular, the second leg of the support load take-up section may be connected to a surface of the plate-shaped section opposed to the support surface of the plate-shaped section.

The aircraft primary structure component is preferably executed in the form of a frame. The support element is then in particular dimensioned in such a way and attached to the aircraft interior fitting component in such a position that, in the assembled state of the aircraft interior fitting component in an aircraft, it is supported on a side face of the frame extending substantially perpendicular to the x-axis of the aircraft at least when the predetermined load acts on the aircraft interior fitting component along the x-axis of the aircraft in flight direction. A two-dimensional load introduction into the aircraft primary structure component is achieved by this, which facilitates an improved conduction of the load away into the aircraft primary structure.

In a preferred embodiment of the aircraft interior fitting component system, the support element has a shape that is adapted to the shape of the aircraft primary structure component. In particular, the support surface of the support element formed on the plate-shaped section of the support element may have a shape that is adapted to the shape of the side face of a frame forming the aircraft primary structure component. An optimal load transfer from the support element to the aircraft primary structure component is made possible by this.

In a method for manufacturing an aircraft interior fitting component system, an aircraft interior fitting component is provided. A support element is attached to the aircraft interior fitting component. An aircraft primary structure component is also provided. The support element is dimensioned in such a way and attached to the aircraft interior fitting component in such a position that, in an assembled state of the aircraft interior component in an aircraft, it is supported on the aircraft primary structure component at least when a predetermined load acts on the aircraft interior fitting component along an x-axis of the aircraft in flight direction.

The support element is preferably dimensioned in such a way and attached to the aircraft interior fitting component in such a position that, in an assembled state of the aircraft interior component in an aircraft, it is arranged at a distance from the aircraft primary structure component when no load, or only a load falling below the predetermined load, acts on the aircraft interior fitting component along the x-axis of the aircraft in flight direction.

The aircraft interior fitting component may be in the form of a baggage compartment, a lining component or a monument.

The support element preferably comprises a plate-shaped section with a support surface, wherein the support surface may be provided to come into abutment on the aircraft primary structure component when the predetermined load acts on the aircraft interior fitting component along the x-axis of the aircraft in flight direction. The support element may further comprise at least one support load take-up section, which may be configured to take up a support load that acts on the support element along the x-axis of the aircraft in a direction opposed to the flight direction of the aircraft when the support element is supported on the aircraft primary structure component.

The at least one support load take-up section preferably has a triangular shape. A first leg of the support load take-up section is preferably connected to the aircraft interior fitting component. A second leg of the support load take-up section is preferably connected to the plate-shaped section of the support element.

The aircraft primary structure component is preferably executed in the form of a frame, wherein the support element in particular is dimensioned in such a way and attached to the aircraft interior fitting component in such a position that, in the assembled state of the aircraft interior fitting component in an aircraft, it is supported on a side face of the frame extending substantially perpendicular to the x-axis of the aircraft at least when the predetermined load acts on the aircraft interior fitting component along the x-axis of the aircraft in flight direction.

The support element and in particular the support surface of the support element formed on the plate-shaped section of the support element may have a shape that is adapted to the shape of the aircraft primary structure component and in particular to the shape of the side face of a frame forming the aircraft primary structure component.

Additional aspects, embodiments, and details of the invention, all of which may be combinable in any manner, are set forth in the following detailed description of the invention.

BRIEF DESCRIPTION OF THE DRAWINGS

A preferred embodiment of the invention is now explained in greater detail with reference to the enclosed schematic drawings, of which

DETAILED DESCRIPTION OF EMBODIMENTS OF THE INVENTION

One or more embodiments of the present invention will be described with the understanding that the following description is not intended to be limiting.

Figure 1:
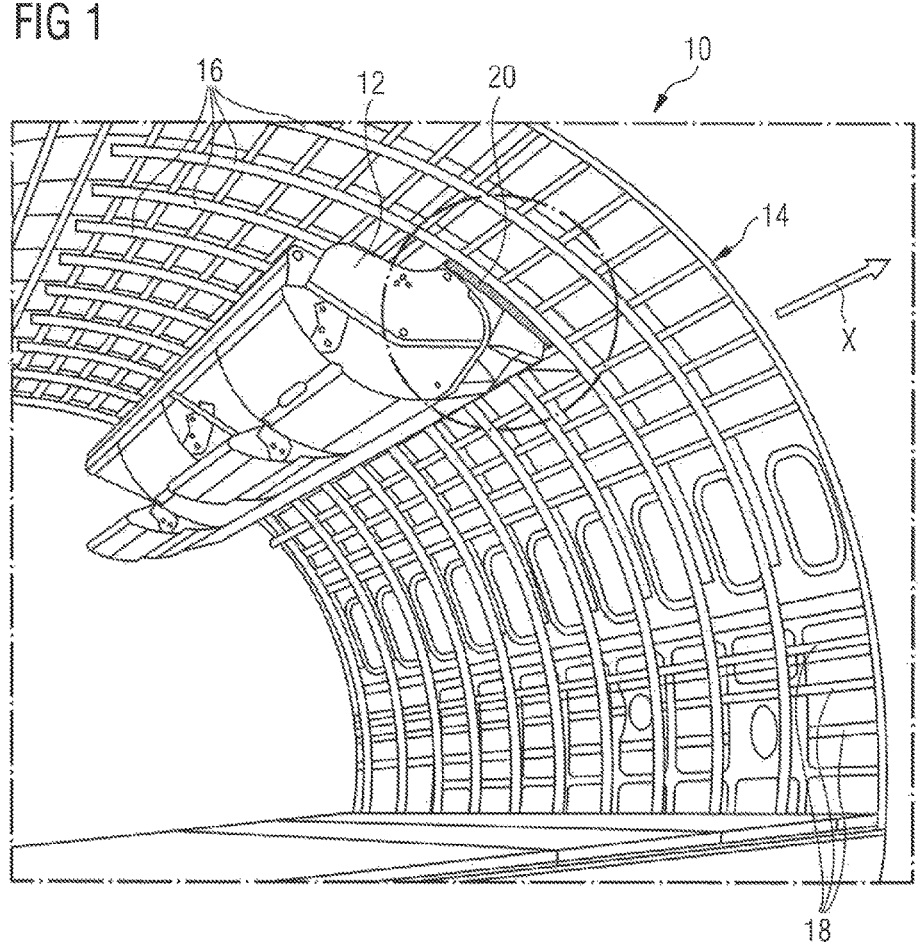
FIG. 1 shows a three-dimensional view of a first embodiment of an aircraft interior fitting component system and FIGS. 2 and 3 show detailed views of the aircraft interior fitting component system according to FIG. 1.
Figure 2:
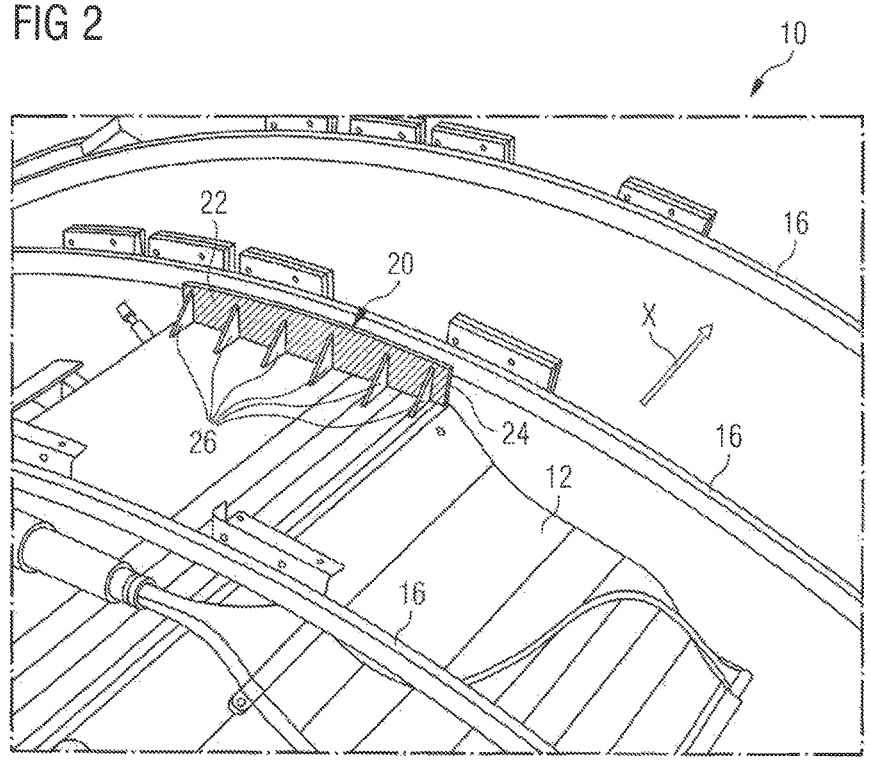
Figure 3:
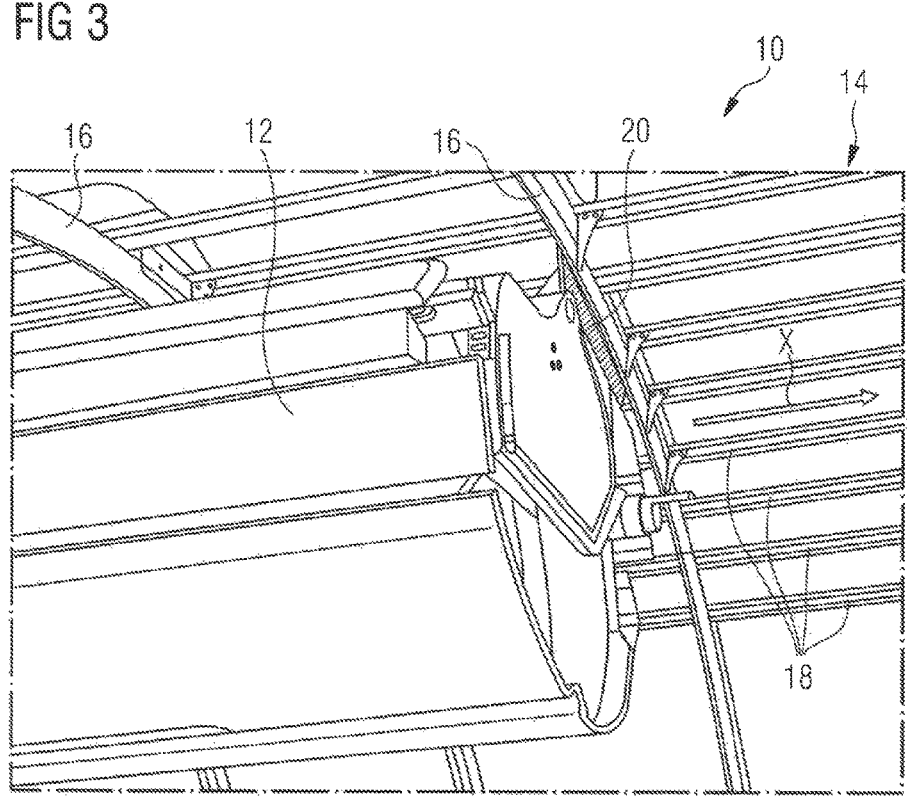

An aircraft interior fitting component system 10 shown in FIGS. 1 to 3 comprises an aircraft interior fitting component 12, which in the embodiment of an aircraft interior fitting component system 10 shown in FIGS. 1 to 3 is in the form of a baggage compartment. The aircraft interior fitting component 12 is attached by brackets, which are not illustrated in greater detail in the figures, to an aircraft primary structure 14. The aircraft primary structure 14 comprises a plurality of aircraft primary structure components 16, 18, of which a portion are in the form of frames arranged parallel to one another and a portion are in the form of stringers 18 arranged parallel to one another.

The brackets are configured to take up forces directed along a y-axis of an aircraft equipped with the aircraft interior fitting component system 10 and along a z-axis of the aircraft, which forces act on the aircraft interior fitting component 12 in normal flight mode of the aircraft. The term "y-axis" here describes an axis of the aircraft that extends perpendicularly to a longitudinal axis of the aircraft between an upper fuselage shell and a lower fuselage shell of the aircraft. The term "z-axis" here describes an axis of the aircraft that extends perpendicularly to a longitudinal axis of the aircraft between side walls of the aircraft fuselage lying opposite one another.

The brackets are further configured to take up forces directed along the y-axis of the aircraft and along the z-axis of the aircraft that act on the aircraft interior fitting component 12 in the case of an emergency landing of the aircraft equipped with the aircraft interior fitting component system 10. The brackets therefore secure the aircraft interior fitting component both in normal operation and in the case of an emergency landing of the aircraft equipped with the aircraft interior fitting component system 10 against the forces emerging in these operating phases of the aircraft along the y-axis and the z-axis of the aircraft and thus ensure that the aircraft interior fitting component 12 remains fixed in its position on the aircraft primary structure 14 both in the direction of the y-axis and in the direction of the z-axis.

Furthermore, the brackets are configured to take up forces directed along an x-axis, which forces act on the aircraft interior fitting component 12 in normal flight mode of the aircraft equipped with the aircraft interior fitting component system 10. The term "x-axis" here describes the longitudinal axis of the aircraft. If, on the other hand, a load directed along the x-axis in flight direction of the aircraft acts on the aircraft interior fitting component 12, the brackets permit a movement of the aircraft interior fitting component 12 along the x-axis in flight direction of the aircraft. To this end the brackets are provided, for example, with suitable elastically deformable elements, such as shock absorbers.

A support element 20 is attached to the aircraft interior fitting component 12. The support element 20 is dimensioned in such a way and attached to the aircraft interior fitting component 12 in such a position that, in an assembled state of the aircraft interior fitting component 12 in an aircraft, it is arranged at a distance A from an aircraft primary structure component 16 when no load, or only a load falling below the predetermined load, acts on the aircraft interior fitting component 12 along the x-axis in flight direction of the aircraft. Such a dimensioning and positioning of the support element 20 ensures that in normal flight mode of the aircraft equipped with the aircraft interior fitting component system 10, no permanent contact causing wear exists between the support element 20 and the aircraft primary structure component 16.

In a load case, i.e. when the predetermined load acts on the aircraft interior fitting component along the x-axis of the aircraft in flight direction, a displacement of the aircraft interior fitting component 12 takes place along the x-axis of the aircraft in flight direction, due to which the support element 20 comes into abutment on the aircraft primary structure component 16. The support element 20 is therefore dimensioned in such a way and attached to the aircraft interior fitting component 12 in such a position that, in an assembled state of the aircraft interior component 12 in an aircraft, it is supported on the aircraft primary structure component 16 at least when the predetermined load acts on the aircraft interior fitting component 12 along the x-axis of the aircraft in flight direction. The predetermined load may be a load, for example, which acts on the aircraft interior fitting component 12 in the case of an emergency landing of the aircraft equipped with the aircraft interior fitting component system 10. For example, the predetermined load may be 9 g. However, the predetermined load that causes such a displacement of the aircraft interior fitting component 12 along the x-axis in flight direction of the aircraft that the support element 20 comes into abutment on the aircraft primary structure component 16 may also be chosen to be correspondingly smaller if supporting of the aircraft interior fitting component 12 on the aircraft primary structure component 16 is desired at smaller loadings.

In the practical examples of an aircraft interior fitting component system 10 shown in the figures, the aircraft primary structure component 16 provided for interaction with the support element 20 is a frame. Furthermore, the support element 20 is in particular dimensioned in such a way and attached to the aircraft interior fitting component 12 in such a position that, in an assembled state of the aircraft interior component 12 in an aircraft, it is supported on a side face of the frame extending substantially perpendicularly to the x-axis of the aircraft at least when the predetermined load acts on the aircraft interior fitting component 12 along the x-axis of the aircraft in flight direction.

As can be recognised best in FIG. 2, the support element 20 comprises a plate-shaped section 22. The plate-shaped section 22 is provided with a support surface 24, which is provided to come into abutment on the aircraft primary structure component 16, i.e. the side face of the frame forming the aircraft primary structure component 16, when the predetermined load acts on the aircraft interior fitting component 12 along the x-axis of the aircraft in flight direction. To guarantee an optimal load introduction into the aircraft primary structure component 16 and consequently the aircraft primary structure 14, the support element 20 and in particular its plate-shaped section 22 has a shape that is adapted to the shape of the aircraft primary structure component 16, i.e. the shape of the side face of the frame forming the aircraft primary structure component 16.

Furthermore, the support element 20 is provided with a plurality of support load take-up sections 26. Each support load take-up section 26 is configured to take up a support load that acts on the support element 20 along the x-axis of the aircraft in a direction opposed to the flight direction when the support element 20 is supported on the aircraft primary structure component 16. Each support load take-up section 26 has a triangular shape. A first leg of each support load take-up section 26 is connected to the aircraft interior fitting component 12, whereas a second leg of each support load take-up section 26 is connected to the plate-shaped section 22 of the support element 20.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:
1. An aircraft interior fitting component system, comprising:
   an aircraft interior fitting component,
   a support element attached to the aircraft interior fitting component, and an aircraft primary structure component comprising a frame of the aircraft, the frame comprising a side face extending substantially perpendicularly to the x-axis of the aircraft, wherein the support element is dimensioned in such a way and is attached to the aircraft interior fitting component in such a position that, in an assembled state of the aircraft interior fitting component in an aircraft, the support element is supported on the aircraft primary structure component at least when a predetermined load acts on the aircraft interior fitting component along an x-axis of the aircraft in a flight direction, wherein the support element comprises a support surface provided to come into abutment on the side surface of the frame when the predetermined load acts on the aircraft interior fitting component along the x-axis of the aircraft in the flight direction.

2. The aircraft interior fitting component system according to claim 1, wherein the support element is dimensioned in such a way and attached to the aircraft interior fitting component in such a position that, in an assembled state of the aircraft interior fitting component in an aircraft, the support element is arranged at a distance from the side surface of the fame when no load, or only a load falling below the predetermined load, acts on the aircraft interior fitting component along the x-axis of the aircraft in the flight direction.

3. The aircraft interior fitting component system according to claim 1, wherein the aircraft interior fitting component is in the form of a baggage compartment, a lining component, or a monument.

4. The aircraft interior fitting component system according to claim 1, wherein the support element comprises a plate-shaped section with the support surface.

5. The aircraft interior fitting component system according to claim 4, wherein the support element further comprises at least one support load take-up section, which is configured to take up a support load that acts on the support element along the x-axis of the aircraft in a direction opposed to the flight direction when the support element is supported on the side surface of the frame.

6. The aircraft interior fitting component system according to claim 5, wherein the at least one support load take-up section has a triangular shape, wherein a first leg of the at least one support load take-up section is connected to the aircraft interior fitting component and wherein a second leg of the at least one support load take-up section is connected to the plate-shaped section of the support element.

7. The aircraft interior fitting component system according to claim 4, wherein the support surface of the support element formed on the plate-shaped section of the support element has a shape that is adapted to the shape of the side face of the frame forming the aircraft primary structure component.

8. A method for manufacturing an aircraft interior fitting component system comprising the steps:
providing an aircraft interior fitting component, attaching a support element to the aircraft interior fitting component, and providing an aircraft primary structure component comprising a frame of the aircraft, the frame comprising a side face extending substantially perpendicularly to the x-axis of the aircraft, wherein the support element is dimensioned in such a way and is attached to the aircraft interior fitting component in such a position that, in an assembled state of the aircraft interior fitting component in an aircraft, the support element is supported on the side surface of the frame at least when a predetermined load acts on the aircraft interior fitting component along an x-axis of the aircraft in a flight direction, and wherein the support element comprises a support surface provided to come into abutment on the side surface of the frame when the predetermined load acts on the aircraft interior fitting component along the x-axis of the aircraft in the flight direction.

9. The method according to claim 8, wherein the support element is dimensioned in such a way and attached to the aircraft interior fitting component in such a position that, in an assembled state of the aircraft interior fitting component in an aircraft, the support element is arranged at a distance from the side surface of the frame when no load, or only a load falling below the predetermined load, acts on the aircraft interior fitting component along the x-axis of the aircraft in the flight direction.

10. The method according to claim 8, wherein the aircraft interior fitting component is in the form of a baggage compartment, a lining component, or a monument.

11. The method according to claim 8, wherein the support element comprises a plate-shaped section with the support surface.

12. The method according to claim 8, wherein the support element further comprises at least one support load take-up section, which is configured to take up a support load that acts on the support element along the x-axis of the aircraft in a direction opposed to the flight direction when the support element is supported on the side surface of the frame.

13. The method according to claim 12, wherein the at least one support load take-up section has a triangular shape, wherein a first leg of the at least one support load take-up section is preferably connected to the aircraft interior fitting component and wherein a second leg of the at least one support load take-up section is preferably connected to the plate-shaped section of the support element.

14. The method according to claim 8, wherein the support surface of the support element formed on the plate-shaped section of the support element has a shape that is adapted to the shape of the side face of the frame forming the aircraft primary structure component.

* * * * *